UNITED STATES PATENT OFFICE.

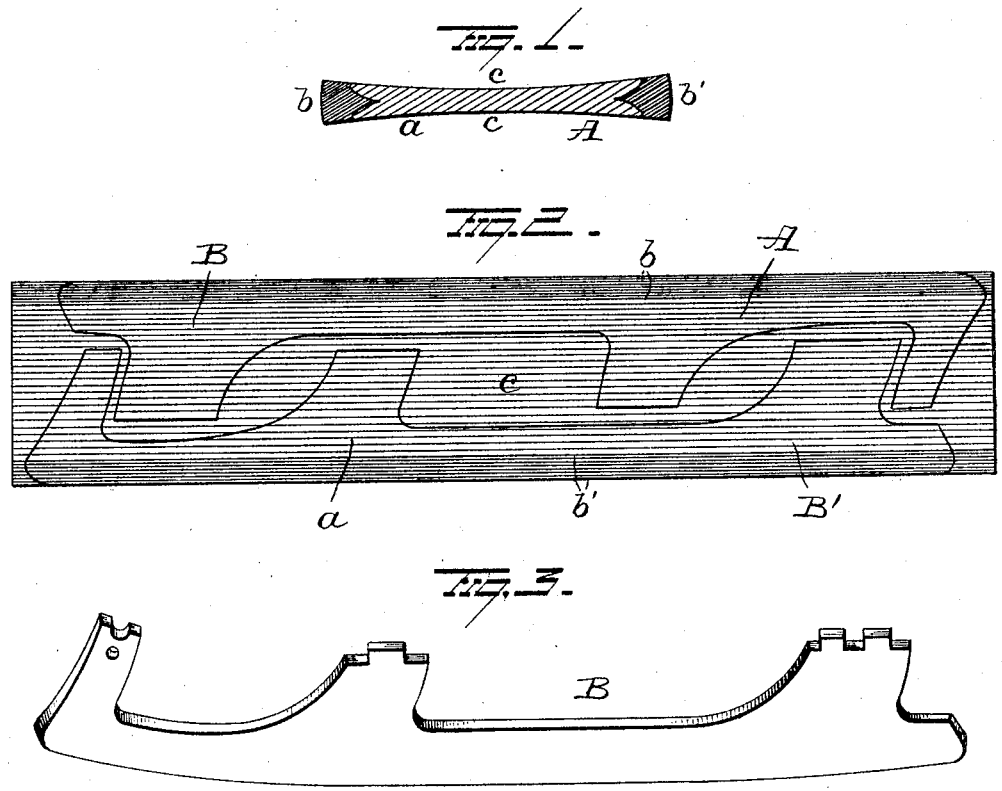

THOMAS W. BRYANT, OF TORRINGTON, CONNECTICUT.

SKATE-RUNNER.

No. 803,269.      Specification of Letters Patent.      Patented Oct. 31, 1905.

Application filed February 10, 1904. Serial No. 192,983.

*To all whom it may concern:*

Be it known that I, THOMAS W. BRYANT, of Torrington, in the county of Litchfield and State of Connecticut, have invented certain new and useful Improvements in Skate-Runners; and I do hereby declare the following to be a full, clear, and exact description of the invention, such as will enable others skilled in the art to which it appertains to make and use the same.

My invention relates to an improvement in skate-runners, the object of the invention being to provide a skate-runner having a tough, fibrous, and highly-condensed body of iron and a hard highly-tempered steel tread welded thereto.

With this object in view the invention consists in certain novel features of construction and combinations and arrangements of parts, as hereinafter set forth, and pointed out in the claim.

In the accompanying drawings, Figure 1 is a cross-section of a bar from which my improved skate-runner is blanked out. Fig. 2 illustrates the method of punching out two skate-runners from opposite sides of the bar, and Fig. 3 illustrates the completed skate-runner.

In producing the bar A an ingot is first made, having its central or body portion formed of iron or low-carbon soft steel, which will not temper, and two of its edges have welded thereto a layer of proper thickness of high-carbon steel. The ingot is reduced by successive hammering to a billet of the proper size and shape for rolling into a bar of the required section and shape for a skate-blade. The bar is first subjected to hot-rolling, and finally is cold-rolled into the form shown in cross-section in Fig. 1. The finished bar A consists of a central portion or web *a* of iron or low-carbon steel which is highly condensed and made homogeneous and of uniform density by the process of cold-rolling, while the opposite edges *b b'* are composed of high-carbon steel of suitable depth and thickness to form the tread of skate-runners and which are welded to the iron web or body. The bar is transformed by cold-rolling into the shape shown in the drawings, the side surfaces *c c* being made concave and of the required varying thickness to produce the desired shape and thickness of runner. The operation of cold-rolling the bar not only serves to render the metal exceedingly dense, uniform, and homogeneous, but imparts a perfectly smooth and highly-finished surface to the sides and edges of the bar. The edges of the iron body or web *a* will overlap the steel tread portions, as shown in Fig. 1. This insures extensive welding-surfaces between the web and tread portions and reduces to a minimum the possibility of the separation of the tread from the web by the great pressure between the rolls during cold-rolling. After a bar of the required cross-section has thus been produced by cold-rolling the runners B B' are blanked out from opposite sides of the bar in the manner shown in Fig. 2. This method of blanking out the runners obviates any unnecessary waste of metal. The runners are then tempered by any suitable method, although I prefer to temper them in a hot-lead bath in order to minimize the oxidation of scaling of the surfaces. The effect of tempering the runner is to harden the steel treads and render them capable of withstanding hard wear and usage without danger of being nicked, roughened, or dulled. Owing to the fact that the web or body of the runner is composed of iron or low-grade steel which will not harden, it is not affected by the process of tempering, and hence the exceedingly dense, tough, and fibrous iron body or web of the runner will constitute a most durable and efficient backing and support for the highly-tempered-steel tread and will impart great strength to the completed article. After the runner has been tempered it is then polished and finished, which is a comparatively cheap and expeditious operation owing to the fact that the process of cold-rolling imparts not only the proper shape or contour to the sides of the runners, but renders its surface exceedingly dense and smooth and adapted to be highly finished and polished with a slight outlay of labor and expense.

The finished article is a great improvement on skate-runners as heretofore made. Owing to the fact that the metal is rendered exceedingly dense and hard by the process of cold-rolling it has imparted to it such a degree of strength and rigidity as to make it possible to produce runners of maximum strength and minimum weight, which is a great desideratum in this class of articles.

Having fully described my invention, what I claim as new, and desire to secure by Letters Patent, is—

A skate-blade consisting of a web formed of wrought-iron throughout its thickness, a tempered-steel tread secured integrally to the wrought-iron web by an overlapping weld, the surfaces, of both the web and tread being covered, protected and finished by a smooth hard cold-rolled skin, substantially as set forth.

In testimony whereof I have signed this specification in the presence of two subscribing witnesses.

THOMAS W. BRYANT.

Witnesses:
WM. H. BRONSON,
DWIGHT W. POST.